US012388287B2

(12) United States Patent
Cui et al.

(10) Patent No.: US 12,388,287 B2
(45) Date of Patent: Aug. 12, 2025

(54) BBU BALANCED POWER SUPPLY CONTROL SYSTEM, MULTI-BBU POWER SUPPLY SYSTEM, AND SERVER

(71) Applicant: SUZHOU METABRAIN INTELLIGENT TECHNOLOGY CO., LTD., Jiangsu (CN)

(72) Inventors: Xuetao Cui, Jiangsu (CN); Yaoyu Hua, Jiangsu (CN); Rengqing Liu, Jiangsu (CN); Lupan Wang, Jiangsu (CN); Qingpeng Shi, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/724,534

(22) PCT Filed: Feb. 27, 2023

(86) PCT No.: PCT/CN2023/078519
§ 371 (c)(1),
(2) Date: Jun. 26, 2024

(87) PCT Pub. No.: WO2024/060513
PCT Pub. Date: Mar. 28, 2024

(65) Prior Publication Data
US 2025/0070590 A1    Feb. 27, 2025

(30) Foreign Application Priority Data
Sep. 22, 2022    (CN) .......................... 202211158647.8

(51) Int. Cl.
*H02J 9/04*    (2006.01)
*H02J 7/00*    (2006.01)

(52) U.S. Cl.
CPC ............ *H02J 9/04* (2013.01); *H02J 7/00032* (2020.01); *H02J 7/0014* (2013.01);
(Continued)

(58) Field of Classification Search
CPC ......................................................... H02J 9/04
See application file for complete search history.

(56) References Cited

U.S. PATENT DOCUMENTS

| 9,504,103 | B2 * | 11/2016 | Denvir | ................... H05B 45/46 |
| 2020/0343723 | A1 | 10/2020 | Li | |
| 2025/0047126 | A1 * | 2/2025 | Kumoda | ................... H02J 7/04 |

FOREIGN PATENT DOCUMENTS

| CN | 103999317 A | | 8/2014 | |
| CN | 104539155 B | * | 9/2017 | .......... H02M 3/1584 |

(Continued)

OTHER PUBLICATIONS

Corresponding International Patent Application No. PCT/CN2023/078519, International Search Report, Date Mailed May 25, 2023.
(Continued)

*Primary Examiner* — Daniel Kessie
(74) *Attorney, Agent, or Firm* — Cooper Legal Group, LLC

(57) ABSTRACT

A BBU balanced power supply control system, including: a control circuit, a gating circuit, a first comparison circuit, a second comparison circuit, and an output voltage stabilizing circuit. A power supply ratio of each BBU is obtained by the control circuit. The power supply ratio is a ratio of an output current to a remaining capacity percentage. An imbalance of the power supply ratio is converted by the first comparison circuit and the second comparison circuit into a corresponding adjustment signal. Finally, by negative feedback of the output voltage stabilizing circuit, the BBU having the highest power supply ratio is controlled to reduce the output (Continued)

current, and the remaining BBUs participating in redundant power supply are enabled to raise the output current. Also disclosed are a multi-BBU power supply system and a server.

20 Claims, 2 Drawing Sheets

(52) U.S. Cl.
CPC .......... *H02J 7/0048* (2020.01); *H02J 7/0063* (2013.01); *H02J 7/00714* (2020.01)

(56) References Cited

FOREIGN PATENT DOCUMENTS

| CN | 108565887 | A |   | 9/2018  |          |
|----|-----------|---|---|---------|----------|
| CN | 111488049 | A | * | 8/2020  | H02J 9/04 |
| CN | 112803613 | A |   | 5/2021  |          |
| CN | 113364091 | A |   | 9/2021  |          |
| CN | 113394804 | A |   | 9/2021  |          |
| CN | 115249996 | A |   | 10/2022 |          |
| JP | 2015027158 | A |  | 2/2015  |          |

OTHER PUBLICATIONS

Corresponding International Patent Application No. PCT/CN2023/078519, Written Opinion, Date Mailed May 25, 2023.
Corresponding Chinese Patent Application No. CN202211158647.8, First Office Action dated Nov. 7, 2022.
Corresponding Chinese Patent Application No. CN202211158647.8, Notice for Patent Grant dated Nov. 24, 2022.

* cited by examiner

BBU BALANCED POWER SUPPLY CONTROL SYSTEM, MULTI-BBU POWER SUPPLY SYSTEM, AND SERVER

CROSS-REFERENCE TO RELATED APPLICATION

This application claims priority to Chinese Patent Application No. 202211158647.8, filed on Sep. 22, 2022 in China National Intellectual Property Administration and entitled "BBU Balanced Power Supply Control System, Multi-BBU Power Supply System, and Server", which is hereby incorporated by reference in its entirety.

FIELD

The present application relates to the field of circuit control, in particular to a battery backup unit (BBU) balanced power supply control system, a multi-BBU power supply system, and a server.

BACKGROUND

With an increase of data volume of a storage system and an improvement of processing capacity, a power consumption of the storage system is also increasing. In an application of upper and lower controllers in a chassis, one controller corresponds to one BBU in traditional applications. When any controller is powered down, only a corresponding BBU is used for backup power to avoid data loss. However, with an increasing power consumption of the storage system, a demand for backup power capacity of the BBU is also increasing. Two BBUs may be used for backup power together when any controller is powered down, whereby capacity of a single BBU may be reduced, and battery capacity and size of the single BBU may also be reduced in design, which is conducive to saving costs and improving a safety level of backup power.

However, inventors realized that a main problem faced by using two BBUs for redundant power supply simultaneously (that is, supplying power to a load device simultaneously, rather than supplying power to a backup BBU when a main BBU is powered down) is that because current battery capacity and voltage of the two BBUs may be different, when current sharing discharge is carried out, the BBU with low capacity may be exhausted in advance, while the other BBU with high capacity has a lot of remaining capacity.

SUMMARY

The present application provides a BBU balanced power supply control system, including: a control circuit, configured for obtaining a remaining capacity percentage and an output current of a BBU, generating reference level signals based on a ratio of the output current to the remaining capacity percentage, and adjusting the output current of the BBU according to an obtained adjustment signal; a gating circuit, where the gating circuit is a voltage following circuit based on an operational amplifier, an output end includes a diode in series, and the gating circuit is configured for connecting to an another BBU balanced power supply control system through a negative end of the diode, and selecting a reference level signal having a maximum voltage value among the reference level signals as a first adjustment signal for balanced adjustment to be inputted to a next circuit; a first comparison circuit, where the first comparison circuit is a differential amplifier circuit based on an operational amplifier, and the first comparison circuit is configured for comparing a reference level signal of a local BBU with the first adjustment signal and outputting a second adjustment signal to a next circuit; a second comparison circuit, where the second comparison circuit is an integral amplifier circuit based on an operational amplifier, an output end includes a diode in series, and the second comparison circuit is configured for comparing the second adjustment signal with an input voltage of a forward end and outputting a third adjustment signal, and is connected to a next circuit through a positive end of the diode; and an output voltage stabilizing circuit, configured for collecting an output voltage of the local BBU, comparing the output voltage with the third adjustment signal after being proportionally reduced, and outputting a fourth adjustment signal to the control circuit.

A reference voltage inputted to a forward end of the first comparison circuit is the same as the input voltage inputted to the forward end of the second comparison circuit.

In some embodiments, the first comparison circuit is further configured for: outputting a second adjustment signal having a voltage value greater than the reference voltage in response to the reference level signal of the local BBU being less than the first adjustment signal; and
 outputting the second adjustment signal having the voltage value equal to the reference voltage in response to the reference level signal of the local BBU being equal to the first adjustment signal.

In some embodiments, the second comparison circuit is further configured for: outputting a third adjustment signal having a voltage value reduced over time in response to the second adjustment signal being greater than the input voltage of the forward end; and
 outputting the third adjustment signal having the voltage value equal to the input voltage of the forward end in response to the second adjustment signal being equal to the input voltage of the forward end.

In some embodiments, the output voltage stabilizing circuit is further configured for: outputting a fourth adjustment signal having a voltage value slightly higher than the reference voltage in response to the invariance of a voltage of the third adjustment signal; and
 outputting a fourth adjustment signal having a voltage value reduced accordingly in response to the third adjustment signal being reduced over time.

In some embodiments, the control circuit is further configured for: controlling to raise the output current of the local BBU in response to a voltage value of the fourth adjustment signal being less than the reference voltage;
 controlling to reduce the output current of the local BBU in response to the voltage value of the fourth adjustment signal being greater than the reference voltage; and
 controlling to remain the output current of the local BBU unchanged in response to the voltage value of the fourth adjustment signal being equal to the reference voltage.

In some embodiments, the output voltage stabilizing circuit includes a first voltage divider and a second voltage divider connected in series. An input end of the first voltage divider is connected to a load output end of the local BBU, an output end of the second voltage divider is grounded, and common ends of the first voltage divider and the second voltage divider are connected to a positive electrode of the diode of the output end of the second comparison circuit, where the first voltage divider is greater than the second voltage divider.

In some embodiments, a dividing voltage across the second voltage divider is equal to the reference voltage in response to the BBU balanced power supply control system being in a steady state.

In some embodiments, the control circuit includes: a controller, configured for obtaining a remaining capacity percentage and an output current of the local BBU, and converting the remaining capacity percentage of the BBU into a level signal, where a voltage value of the level signal is inversely proportional to the remaining capacity percentage; and adjusting a duty cycle of an outputted pulse width modulation (PWM) signal according to the obtained adjustment signal; a multiplier, configured for obtaining the output current and the level signal, and outputting a reference level signal after multiplication; and a buck boost circuit, connected to the controller and the local BBU respectively, and configured for adjusting the output current of the BBU according to the PWM signal.

In some embodiments, the control circuit is further configured for: controlling to increase the duty cycle of the PWM signal to raise the output current of the local BBU in response to the voltage value of the fourth adjustment signal being less than the reference voltage;
controlling to reduce the duty cycle of the PWM signal to reduce the output current of the local BBU in response to the voltage value of the fourth adjustment signal being greater than the reference voltage; and
controlling to remain the duty cycle of the PWM signal unchanged in response to the voltage value of the fourth adjustment signal being equal to the reference voltage.

In some embodiments, the control circuit is further configured for: accessing a SOC register of the BBU to obtain the remaining capacity percentage of the BBU.

In a second aspect of the present disclosure, a multi-BBU power supply system based on the BBU balanced power supply control system in the above embodiments is provided, including: a plurality of BBU balanced power supply control systems and a plurality of BBUs, where each of the plurality of BBUs is connected to a corresponding BBU balanced power supply control system, and the plurality of BBUs balanced power supply control systems are connected in parallel through the gating circuit, and are configured for performing the balanced adjustment on load currents required by each of the plurality of BBUs according to remaining capacity percentages of the plurality of BBUs.

In some embodiments, a number of the plurality of BBU balanced power supply control systems and a number of the plurality of BBUs are at least 2; and
the plurality of multi-BBU power supply systems are configured for performing multi-BBU parallel balanced power supply for one or more load devices.

In some embodiments, in response to the ratios of the plurality of load currents of the plurality of BBUs to the corresponding remaining capacity percentages being different, the plurality of BBU balanced power supply control systems respectively perform the following actions: a BBU balanced power supply control system corresponding to a BBU having a maximum ratio of the load current to the corresponding remaining capacity percentage controls to reduce the output current of the BBU; and
a BBU balanced power supply control system corresponding to another BBU controls to raise the output current of the BBU.

In some embodiments, in response to ratios of the plurality of load currents of the plurality of BBUs to the corresponding remaining capacity percentages being equal, the BBU balanced power supply control systems are all in a steady state, and the output currents of the BBUs remain unchanged.

In a third aspect of the present application, a server is provided. One or more BBU balanced power supply control systems in the above embodiments are integrated in the server, and the BBU balanced power supply control system is configured as a backup power interface of the server.

BRIEF DESCRIPTION OF THE DRAWINGS

In order to more clearly illustrate a technical solution of the embodiments of the present disclosure, accompanying drawings required to be used in the description of the prior art and the embodiments will be briefly described below. The components in the accompanying drawings are not necessarily drawn to scale, and the relevant elements may be omitted, or in some cases, the scale may have been enlarged in order to emphasize and clearly illustrate the novel features described herein. In addition, as is known in the art, the structural order may be arranged differently.

DETAILED DESCRIPTION

While the present disclosure may be implemented in various forms, some exemplary and non-limiting embodiments are shown in drawings and will be described below, it should be understood that the present disclosure will be regarded as an example of the present disclosure and is not intended to limit the present disclosure to particular embodiments illustrated.

In order to realize multi-BBU balanced power supply and realize real-time automatic adjustment, a BBU balanced power supply control system is provided in an aspect of the present disclosure. The BBU balanced power supply control systems are connected in parallel to enable controlled BBUs to output a load current proportionally according to remaining capacity, so as to avoid a problem of a certain BBU being exhausted in advance. A technical solution of the present disclosure will be described in more detail below in conjunction with accompanying drawings.

Figure 1:
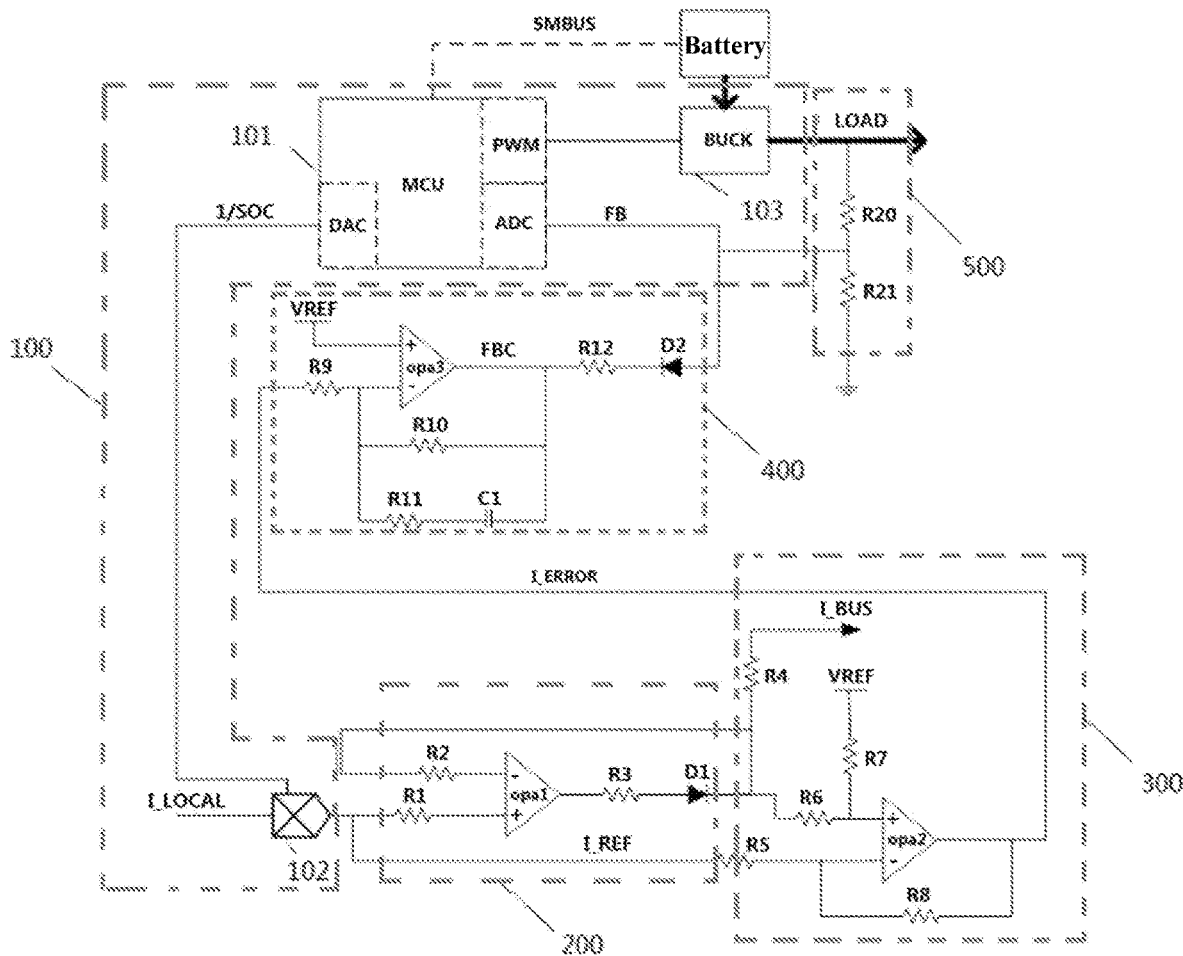
FIG. 1 is a circuit diagram of a BBU balanced power supply control system according to one or more embodiments of the present application.

FIG. 1 is a circuit diagram of a BBU balanced power supply control system according to the present disclosure. As shown in FIG. 1, the BBU balanced power supply control system according to the present disclosure includes: a control circuit 100, configured for obtaining a remaining capacity percentage and an output current of a BBU, generating reference level signals based on a ratio of the output current to the remaining capacity percentage, and adjusting the output current of the BBU according to an obtained adjustment signal; a gating circuit 200, where the gating circuit 200 is a voltage following circuit based on an operational amplifier, an output end of the gating circuit 20 includes a diode D1 in series, and the gating circuit is configured for connecting to an another BBU balanced power supply control system through a negative end of the diode D1, and selecting a reference level signal having a maximum voltage value among a plurality of reference level signals as a first adjustment signal for balanced adjustment to be inputted to a next circuit; a first comparison circuit 300, where the first comparison circuit 300 is a differential amplifier circuit based on an operational amplifier, and first comparison circuit 300 is configured for comparing a reference level signal of a local BBU with the first adjustment signal and outputting a second adjustment signal to a next circuit; a second comparison circuit 400, where the second comparison circuit 400 is an integral amplifier circuit based on an operational amplifier, an output end includes a diode D2 in series, and the second comparison circuit is configured for comparing the second adjustment signal with an input voltage of a forward end and outputting a third adjustment signal, and is connected to a next circuit through a positive end of the diode D2; and an output voltage stabilizing circuit 500, configured for collecting an output voltage of the local BBU, comparing the output voltage being proportionally reduced with the third adjustment signal, and outputting a fourth adjustment signal to the control circuit 100. A reference voltage inputted to a forward end of the first comparison circuit 300 is the same as the input voltage inputted to the forward end of the second comparison circuit 400.

In some embodiments, in order to realize multi-BBU balanced power supply, it is necessary to input the ratio of the output current of each BBU to the remaining capacity percentage into the power supply control system as one of adjustment signals, whereby the power supply control system may obtain a status of each BBU in real time, and then perform corresponding load output adjustments. The control circuit 100 is mainly responsible for collecting related electrical signals, converting the ratio of the output current to the remaining capacity percentage into a level signal to be inputted into the power supply control system, and controlling the output current of the BBU according to a final adjustment signal (fourth adjustment signal). The gating circuit adopts the voltage following circuit based on the operational amplifier. On the one hand, the gating circuit has a function of stabilizing voltage and may ensure a stable output of the reference level signal. Because the gating circuit is also responsible for introducing reference level signals of BBUs in other BBU balanced power supply control systems, the following circuit may avoid an influence of an external input signal on a local reference level signal. Functions of the first comparison circuit and the second comparison circuit are to convert an "imbalance" between different power supply control systems into the final adjustment signal (fourth adjustment signal) and compare the adjustment signal with a preset reference voltage, whereby the systems perform corresponding current output adjustments.

In some embodiments, taking a balanced power supply of two BBUs as an example, a controller reads a state of charge (SOC) register of a metering chip within a battery through a system management bus (SMbus) to obtain an SOC (remaining capacity percentage) of the battery. Then, a reciprocal 1/SOC of the SOC is converted into an analog signal within a voltage range of 0-1 V by digital-to-analog (DA) conversion. Analog multiplication operations are performed between the analog signal and a discharge current sampling signal of the BBU to obtain a current sharing reference level I_REF:

$$I\_REF = \frac{I\_local}{SOC} \qquad \text{(Formula 1)}$$

I_REF is sent to a non-inverting input end of an operational amplifier opa1 through a resistor R1. Resistors R2 and R3, and the diode D1 form a negative feedback network, whereby an output I_OUT is equal to I_REF. Then, I_OUT is sent to a current sharing bus I_BUS1 through a resistor R4. Here, a current sharing bus I_BUS2 from an opposite control BBU will be connected through a connector assembly and a backplane. Two nodes are short connected together, and voltages are equal to I_BUS.

$$I\_BUS1 = I\_BUS2 = I\_BUS \qquad \text{(Formula 2)}$$

When a current sharing reference level I_REF2 from the opposite control BBU is higher than I_REF of a local control BBU, due to a clamping effect of D1 causing opa1 negative feedback to fail, I_OUT is raised to the current sharing bus voltage I_BUS2 of the opposite control BBU. When the current sharing reference level I_REF2 from the opposite control BBU is lower than I_REF of the local control BBU, the negative feedback takes effect, causing I_OUT to follow I_REF, thereby also raising the current sharing bus voltage I_BUS to I_REF. Therefore, the current sharing bus voltage I_BUS is always equal to a higher of the current sharing reference levels I_REF and I_REF2 of the two controller BBUs.

In a further embodiment, the first comparison circuit 300 is further configured for: outputting a second adjustment signal having a voltage value greater than the reference voltage in response to the reference level signal of the local BBU being less than the first adjustment signal; and outputting the second adjustment signal having the voltage value equal to the reference voltage in response to the reference level signal of the local BBU being equal to the first adjustment signal.

In some embodiments, a comparison result of the first comparison circuit 300 determines which BBUs need to reduce the output current, which BBUs need to raise the output current. In some embodiments, the BBU with the maximum power supply ratio (namely, the ratio of the output current to the remaining capacity percentage) is allowed to reduce the output current, and other BBUs with a relatively small power supply ratio are allowed to raise the output current. It will be understood that a reason for the relatively large power supply ratio may be that the numerator is large, that is, the outputted power supply current is significantly greater than the outputted power supply current of other BBUs, or may be that the denominator is small, that is, the remaining capacity is small, and the output current needs to be reduced in order to avoid power being exhausted in advance. Furthermore, the first comparison circuit of the present application adopts a differential amplifier circuit based on an operational amplifier. Therefore, another function of the first comparison circuit is to introduce a reference voltage through the differential amplifier circuit, whereby the first comparison circuit may limit the output voltage of the adjustment signal to be a vicinity of the reference voltage, and the output result of the first comparison circuit is either equal to or greater than the reference voltage.

In some embodiments, following an above example of balanced power supply of the two BBUs, an operational amplifier opa2 compares local I_REF with the current sharing bus voltage I_BUS, and performs differential amplification on an error to form an I_ERROR signal. A reference level of a non-inverting input end of opa2 is VREF, and when I_BUS of the non-inverting input end is equal to I_REF of an inverting input end, the output I_ERROR of opa2 will be equal to VREF. Then, after opa3 performs integral amplification on a difference between VREF and I_ERROR, the difference is connected to a voltage feedback signal FB through a resistor R12 and the diode D2, a digital controller performs analog-to-digital (AD) sampling on FB, and adjusts and outputs a duty cycle of a buck circuit according to the size of FB, whereby the BBUs of the two controllers realize current sharing:

$$\frac{I\_local}{SOC1} = \frac{I\_oppsite}{SOC2} \quad \text{(Formula 3)}$$

where I_local represents the discharge current of the local control (local) BBU, I_oppsite represents a discharge current of the opposite control BBU, SOC1 represents a remaining capacity percentage of the local control BBU, and SOC2 represents a remaining capacity percentage of the opposite control BBU.

In a further embodiment, the second comparison circuit 400 is further configured for: outputting a third adjustment signal having a voltage value reduced over time in response to the second adjustment signal being greater than the input voltage of the forward end; and outputting the third adjustment signal having the voltage value equal to the input voltage of the forward end in response to the second adjustment signal being equal to the input voltage of the forward end.

In some embodiments, a function of the second comparison circuit is to adjust the voltage of the third adjustment signal according to the power supply ratio of each BBU in real time, whereby the voltage of the third adjustment signal is either the input voltage of the forward end (consistent with the reference voltage), or reduced over time. On this basis, through the power supply voltage that is negatively fed back from the output voltage stabilizing circuit, a negative feedback adjustment to the BBU with the maximum power supply ratio is realized, so as to realize the closed loop of balanced adjustment, and avoid the load voltage outputted by the BBU being too high after raising the output current of other BBUs. The output voltage stabilizing circuit is further configured for: outputting a fourth adjustment signal having a voltage value slightly higher than the reference voltage in response to the invariance of the voltage of the third adjustment signal; and outputting a fourth adjustment signal having a voltage value reduced accordingly in response to the third adjustment signal being reduced over time.

In some embodiments, when the voltage of the third adjustment signal outputted by the second comparison circuit is the reference voltage, the outputted load voltage is raised because the total load current outputted by each BBU is raised, whereby the dividing voltage on the second voltage divider is greater than the reference voltage, and D2 is turned on. However, because D2 has a certain on-voltage drop, the voltage of the fourth adjustment signal outputted is still slightly greater than the reference voltage, thereby triggering the negative feedback adjustment for a power supply control circuit of a BBU with a high power supply ratio. The output voltage stabilizing circuit includes a first voltage divider and a second voltage divider connected in series. An input end of the first voltage divider is connected to a load output end of the local BBU, an output end of the second voltage divider is grounded, and common ends of the first voltage divider and the second voltage divider are connected to a positive electrode of the diode of the output end of the second comparison circuit, where the first voltage divider is greater than the second voltage divider.

In some embodiments, following the above example of balanced power supply of the two BBUs, a complete feedback adjustment process of the present disclosure includes: when I_REF of the local control BBU is less than I_REF2 of the opposite control BBU, I_BUS is equal to I_REF2, whereby the inverting input voltage of opa2 is higher than the non-inverting input voltage, the output I_ERROR is greater than VREF through the differential amplification of the operational amplifier, and the output FBC is less than VREF through the integral amplification of opa3. R20 and R21 divide the output voltage to form the voltage feedback signal FB, and FB is sent to an AD sampling port of the digital controller and compared with VREF to form a PWM control signal. After FBC is less than VREF, the FB signal will be compensated and FB will be pulled down. In order to maintain the FB voltage equal to VREF, the digital controller will increase the PWM duty cycle, thereby raising the output current.

At the same time, after the output current of the local control BBU is raised, the output voltage VLOAD will be raised, whereby the FB signal of the opposite control BBU will be raised. In order to make the FB signal equal to VREF, the digital controller of the opposite control BBU will reduce the PWM duty cycle, thereby reducing the output current. After satisfying Formula 3, the two controllers will reach balance, the two FBC signals are equal to VREF, and FB will not be compensated, thereby realizing current sharing control.

In the above example, when a controller generates backup power, the local control and opposite control BBUs perform 1+1 redundant power supply. Due to the adoption of a balanced power supply policy proportional to the remaining capacity of SOC, the two BBUs will be exhausted at the same time, thereby avoiding a problem that one BBU is exhausted in advance due to low initial power in an ordinary current sharing mode, resulting in excessive discharge pressure of the other BBU alone.

In a further embodiment, the control circuit 100 is further configured for: controlling to raise the output current of the local BBU in response to the voltage value of the fourth adjustment signal being less than the reference voltage; controlling to reduce the output current of the local BBU in response to the voltage value of the fourth adjustment signal being greater than the reference voltage; and controlling to remain the output current of the local BBU unchanged in response to the voltage value of the fourth adjustment signal being equal to the reference voltage.

In a further embodiment, the control circuit 100 includes: a controller, configured for obtaining a remaining capacity percentage and an output current of the local BBU, and converting the remaining capacity percentage of the BBU into a level signal, where a voltage value of the level signal is inversely proportional to the remaining capacity; and adjusting a duty cycle of an outputted PWM signal according to the obtained adjustment signal; a multiplier 102, configured for obtaining the output current and the level signal, and outputting a reference level signal after multiplication; and a buck boost circuit 103, connected to the controller and the local BBU respectively, and configured for adjusting the output current of the BBU according to the PWM signal.

In a further embodiment, the control circuit 101 is further configured for: controlling to increase the duty cycle of the PWM signal to raise the output current of the local BBU in response to the voltage value of the fourth adjustment signal being less than the reference voltage; controlling to reduce the duty cycle of the PWM signal to reduce the output current of the local BBU in response to the voltage value of the fourth adjustment signal being greater than the reference voltage; and controlling to remain the duty cycle of the PWM signal unchanged in response to the voltage value of the fourth adjustment signal being equal to the reference voltage. In some embodiments, the controller is a micro control unit (MCU) or a central processing unit (CPU), which is configured for realizing AD conversion to obtain the voltage value of the fourth adjustment signal, comparing the voltage value with a preset reference voltage value, controlling the output of the PWM signal, and controlling to increase or reduce the duty cycle or remain the duty cycle unchanged according to the comparison result. The controller 101 accesses the SOC register of the BBU to obtain the remaining capacity percentage of the BBU.

Figure 2:
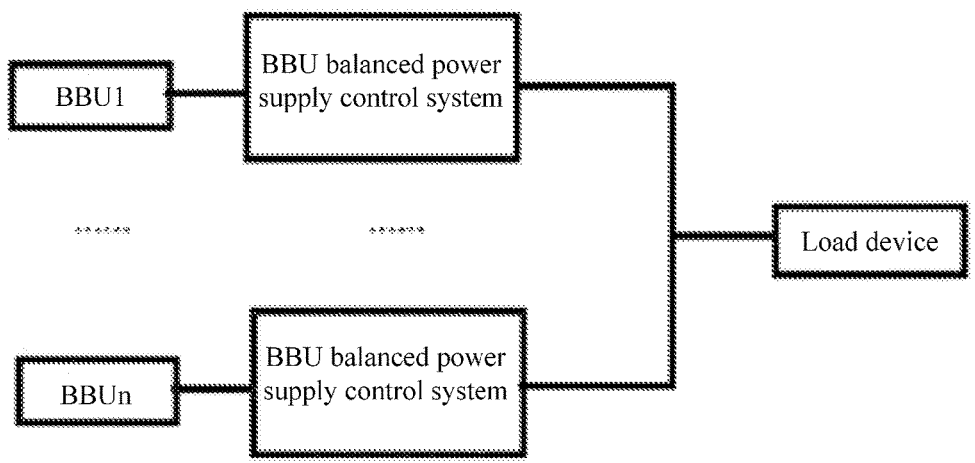
FIG. 2 is a schematic constitutional diagram of a multi-BBU power supply system according to one or more embodiments of the present application.

FIG. 2 is a schematic constitutional diagram of a multi-BBU power supply system according to the present disclosure. As shown in FIG. 2, the multi-BBU power supply system according to the present disclosure includes: a plurality of BBU balanced power supply control systems and a plurality of BBUs, where the plurality of BBUs are connected to the corresponding BBU balanced power supply control systems respectively, and the plurality of BBU balanced power supply control systems are connected in parallel through a gating circuit, and the plurality of BBU balanced power supply control systems are configured for performing the balanced adjustment on load currents required by the BBUs according to remaining capacity percentages of the plurality of BBUs. A number of the plurality of BBU balanced power supply control systems and a number of the plurality of BBUs are at least 2.

In a further embodiment, when ratios of the plurality of load currents of the plurality of BBUs to the corresponding remaining capacity percentages are different, the plurality of BBU balanced power supply control systems respectively perform the following actions: a BBU balanced power supply control system corresponding to a BBU having a maximum ratio of the load current to the corresponding remaining capacity percentage controls to reduce the output current of the BBU; and a BBU balanced power supply control system corresponding to another BBU controls to raise the output current of the BBU.

In some embodiments, in the process of balanced adjustment, the BBU with the maximum power supply ratio will trigger negative feedback due to the raising of the output voltage, and the duty cycle of the PWM signal is reduced to reduce the output current. The remaining BBUs will trigger feedback to increase the duty cycle of the PWM signal due to the drop of an output voltage of a second comparator to increase the output current. When the output voltage of the second comparator is stable at the reference voltage, each balanced power supply system is in a balanced state, and the duty cycle of each PWM signal remains unchanged. At this moment, the state of each BBU is that ratios of the plurality of load currents of the plurality of BBUs to the corresponding remaining capacity percentages are equal.

In a further embodiment, the multi-BBU power supply system is configured for performing multi-BBU parallel balanced power supply for one or more load devices. In some embodiments, the multi-BBU power supply system provided by the present disclosure may supply power to a load device or a system, and the present disclosure is not limited thereto.

Figure 3:
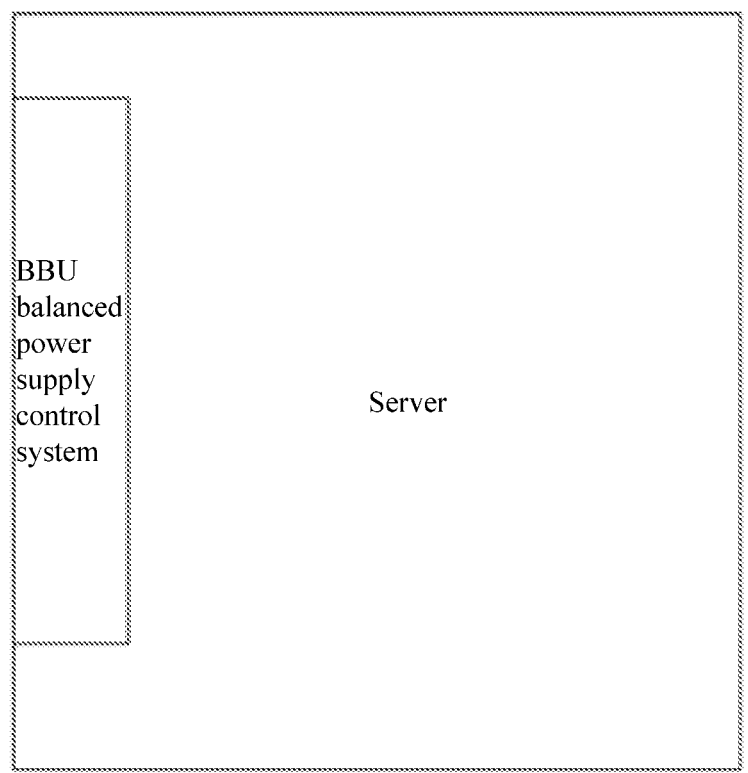
FIG. 3 is a schematic structural diagram of a server according to one or more embodiments of the present application.

FIG. 3 is a schematic structural diagram of a server according to the present disclosure. In a third aspect of the present disclosure, a server is provided. As shown in FIG. 3, one or more BBU balanced power supply control systems (only one system is schematically shown in FIG. 3) as mentioned in the above embodiments are integrated in the server of the present disclosure. The BBU balanced power supply control system is configured as a backup power interface of the server, and is then connected to one or more backup power supplies.

In one application scenario, a plurality of servers each have such a backup power interface provided by the BBU balanced power supply control system, and the plurality of servers may be connected through the backup power interfaces to share a plurality of BBUs.

In another application scenario, a plurality of BBU balanced power supply control systems may be integrated in one server. At this moment, the server allows a plurality of BBUs to be connected at the same time, and is subjected to parallel balanced power supply of the plurality of BBUs.

It will be understood that, where technically feasible, the technical features enumerated above for different embodiments may be combined with each other to form additional embodiments within the scope of the present disclosure. Furthermore, the particular examples and embodiments herein are non-limiting, and the structures, steps, and sequences described above may be modified accordingly without departing from the scope of protection of the present disclosure.

In the present application, the use of adversative conjunctions is intended to include conjunctions. The use of definite or indefinite articles is not intended to indicate cardinal numbers. In particular, references to "the" object or "an" and "one" object are intended to represent one of a plurality of such objects. However, while the elements disclosed by the embodiments of the present disclosure may be described or required in individual form, the elements may be understood to be plural unless expressly limited to singular. Furthermore, instead of mutually exclusive schemes, the conjunction "or" may be used to convey coexisting features. In other words, the conjunction "or" should be understood to include "and/or". The term "include" is inclusive and has the same scope as "comprise".

The above embodiments, in particular any "preferred" embodiments, are possible examples of implementations and are presented only for the purpose of clearly understanding the principles of the present disclosure. Many variations and modifications may be made to the above embodiments without departing substantially from the spirit and principles of the techniques described herein. All modifications are intended to be included within the scope of the present disclosure.

The invention claimed is:

1. A battery backup unit (BBU) balanced power supply control system, comprising:
   a control circuit, configured for obtaining a first remaining capacity percentage and a first output current of a BBU, generating reference level signals based on a ratio of the first output current to the first remaining capacity percentage, and adjusting the first output current of the BBU according to an obtained adjustment signal;
   a gating circuit, wherein the gating circuit is a voltage following circuit based on an operational amplifier, an output end of the gating circuit is in series with a first diode, and the gating circuit is configured for connecting to an another BBU balanced power supply control system through a negative end of the first diode, and selecting a reference level signal having a maximum voltage value among the reference level signals as a first adjustment signal for balanced adjustment to be inputted to a next circuit;

a first comparison circuit, wherein the first comparison circuit is a differential amplifier circuit based on an operational amplifier, and the first comparison circuit is configured for comparing a reference level signal of a local BBU with the first adjustment signal and outputting a second adjustment signal to a next circuit;

a second comparison circuit, wherein the second comparison circuit is an integral amplifier circuit based on an operational amplifier, an output end of the second comparison circuit is in series with a second diode, and the second comparison circuit is configured for comparing the second adjustment signal with an input voltage of a first forward end of the second comparison circuit and outputting a third adjustment signal, and is connected to a next circuit through a positive end of the second diode; and an output voltage stabilizing circuit, configured for collecting an output voltage of the local BBU, comparing the output voltage being proportionally reduced with the third adjustment signal, and outputting a fourth adjustment signal to the control circuit, wherein a reference voltage inputted to a second forward end of the first comparison circuit is the same as the input voltage inputted to the first forward end of the second comparison circuit.

2. The BBU balanced power supply control system according to claim 1, wherein the control circuit comprises a controller, and when obtaining the first remaining capacity percentage and the first output current of the BBU and generating the reference level signals based on the ratio of the first output current to the first remaining capacity percentage, the control circuit is configured for:

reading a state of charge (SOC) register of a metering chip within a local control BBU through a system management bus (SMbus) of the controller to obtain an SOC of the local control BBU, wherein the SOC is the first remaining capacity percentage; and converting a reciprocal of the SOC into an analog signal value within a voltage range of 0-1 V by digital-to-analog (DA) conversion, and performing analog multiplication operations between the analog signal value and a discharge current sampling signal value of the local control BBU to obtain a current sharing reference level, wherein the current sharing reference level is a value of a corresponding one of the reference level signals, the local control BBU is the local BBU, and the another BBU balanced power supply control system is a single opposite control BBU;

a calculation formula for the current sharing reference level is as follows:

$$I\_REF = \frac{I\_local}{SOC},$$

wherein I_REF is the current sharing reference level, I_local is the discharge current sampling signal value of the BBU, and 1/SOC is the analog signal value within the voltage range of 0-1 V.

3. The BBU balanced power supply control system according to claim 2, wherein the gating circuit comprises a first operational amplifier, and when selecting the reference level signal having the maximum voltage value among the reference level signals as the first adjustment signal for the balanced adjustment, the first operational amplifier is configured for:

receiving I_REF, and enabling I_OUT to be equal to I_REF, wherein I_OUT is a value of a second output current of the local control BBU, and the reference level signals are I_REF of the local control BBU and the single opposite control BBU;

sending I_OUT to a local control current sharing bus; wherein a connector assembly and a backplane of the local control BBU are connected to a current sharing bus of the single opposite control BBU, whereby current sharing bus nodes of two BBUs are short connected and voltage values are equal; I_BUS1=I_BUS2=I_BUS, wherein I_BUS1 is a current sharing bus voltage value of the local control BBU, I_BUS2 is a current sharing bus voltage value of the single opposite control BBU, and I_BUS is a current sharing bus voltage value;

raising I_OUT to I_BUS2 as I_BUS in response to I_REF2 being higher than I_REF of the local control BBU, wherein I_REF2 is a current sharing reference level from the single opposite control BBU; and raising I_BUS to I_REF as I_BUS in response to I_REF2 being lower than I_REF of the local control BBU, wherein I_BUS serves as the first adjustment signal for balanced adjustment.

4. The BBU balanced power supply control system according to claim 1, wherein the first comparison circuit is further configured for:

outputting the second adjustment signal having a voltage value greater than the reference voltage in response to the reference level signal of the local BBU being less than the first adjustment signal; and outputting the second adjustment signal having the voltage value equal to the reference voltage in response to the reference level signal of the local BBU being equal to the first adjustment signal.

5. The BBU balanced power supply control system according to claim 3, wherein the first comparison circuit comprises a second operational amplifier, and when comparing the reference level signal of the local BBU with the first adjustment signal and outputting the second adjustment signal, the second operational amplifier is configured for:

comparing I_BUS with I_REF through the second operational amplifier to obtain an error; and performing differential amplification on the error, and outputting an I_ERROR signal, wherein the I_ERROR signal is the second adjustment signal.

6. The BBU balanced power supply control system according to claim 5, wherein the second comparison circuit comprises a third operational amplifier, and when comparing the second adjustment signal with the input voltage of the first forward end and outputting the third adjustment signal, the third operational amplifier is configured for:

comparing the I_ERROR signal with I_BUS of a non-inverting input end of the second operational amplifier, wherein the input voltage of the first forward end is I_BUS of the non-inverting input end; and performing integral amplification on a difference between VREF and the I_ERROR signal and outputting FB in response to I_BUS of the non-inverting input end of the second operational amplifier being equal to I_REF of an inverting input end and a value of the I_ERROR signal outputted by the second operational amplifier being equal to VREF, wherein VREF is the reference voltage, FB is a feedback signal, and the third adjustment signal is FB.

7. The BBU balanced power supply control system according to claim 6, wherein when collecting the output voltage of the local BBU, comparing the output voltage with the third adjustment signal after being proportionally reduced, and outputting the fourth adjustment signal, the output voltage stabilizing circuit is configured for:
  sampling the output voltage of the local control BBU, comparing the output voltage of the local control BBU with FB after being proportionally reduced, and adjusting a duty cycle of an output buck circuit, wherein the duty cycle of the output buck circuit is obtained by the following formula:

$$\frac{I\_local}{SOC1} = \frac{I\_oppsite}{SOC2},$$

wherein I_local is a discharge current value of the local control BBU, I_oppsite is a discharge current value of the single opposite control BBU, SOC1 is a remaining capacity percentage of the local control BBU, and SOC2 is a remaining capacity percentage of the single opposite control BBU.

8. The BBU balanced power supply control system according to claim 1, wherein the second comparison circuit is further configured for:
  outputting the third adjustment signal having a voltage value reduced over time in response to the second adjustment signal being greater than the input voltage of the first forward end; and
  outputting the third adjustment signal having the voltage value equal to the input voltage of the first forward end in response to the second adjustment signal being equal to the input voltage of the first forward end.

9. The BBU balanced power supply control system according to claim 1, wherein the output voltage stabilizing circuit is further configured for:
  outputting the fourth adjustment signal having a voltage value higher than the reference voltage in response to invariance of a voltage of the third adjustment signal; and
  outputting the fourth adjustment signal having a voltage value reduced in response to the third adjustment signal being reduced over time.

10. The BBU balanced power supply control system according to claim 1, wherein the control circuit is further configured for:
  controlling to raise a third output current of the local BBU in response to a voltage value of the fourth adjustment signal being less than the reference voltage;
  controlling to reduce the third output current of the local BBU in response to the voltage value of the fourth adjustment signal being greater than the reference voltage; and
  controlling to keep the third output current of the local BBU unchanged in response to the voltage value of the fourth adjustment signal being equal to the reference voltage.

11. The BBU balanced power supply control system according to claim 1, wherein the output voltage stabilizing circuit comprises a first voltage divider and a second voltage divider connected in series, an input end of the first voltage divider is connected to a load output end of the local BBU, an output end of the second voltage divider is grounded, and common ends of the first voltage divider and the second voltage divider are connected to a positive electrode of the second diode of the output end of the second comparison circuit,
  wherein the first voltage divider is greater than the second voltage divider.

12. The BBU balanced power supply control system according to claim 11, wherein a dividing voltage across the second voltage divider is equal to the reference voltage in response to the BBU balanced power supply control system being in a steady state.

13. The BBU balanced power supply control system according to claim 10, wherein the control circuit comprises:
  a controller, configured for obtaining a second remaining capacity percentage and the third output current of the local BBU, and converting the second remaining capacity percentage of the local BBU into a level signal, wherein a voltage value of the level signal is inversely proportional to the second remaining capacity percentage; and adjusting a duty cycle of an outputted pulse width modulation (PWM) signal according to the obtained adjustment signal;
  a multiplier, configured for obtaining the third output current and the level signal, and outputting a reference level signal after multiplication; and
  a buck boost circuit, connected to the controller and the local BBU respectively, and configured for adjusting the first output current of the BBU according to the PWM signal.

14. The BBU balanced power supply control system according to claim 13, wherein the controller is further configured for:
  controlling to increase the duty cycle of the PWM signal to raise the third output current of the local BBU in response to the voltage value of the fourth adjustment signal being less than the reference voltage;
  controlling to reduce the duty cycle of the PWM signal to reduce the third output current of the local BBU in response to the voltage value of the fourth adjustment signal being greater than the reference voltage; and
  controlling to keep the duty cycle of the PWM signal unchanged in response to the voltage value of the fourth adjustment signal being equal to the reference voltage.

15. The BBU balanced power supply control system according to claim 13, wherein the controller is further configured for:
  accessing a state of charge (SOC) register of the BBU to obtain the first remaining capacity percentage of the BBU.

16. A multi-battery backup unit (BBU) power supply system, comprising: a plurality of BBU balanced power supply control systems, and a plurality of BBUs, wherein each of the plurality of BBUs is connected to a corresponding BBU balanced power supply control system of the plurality of BBU balanced power supply control systems, and
  the plurality of BBU balanced power supply control systems are connected in parallel through a gating circuit, and the plurality of BBU balanced power supply control systems are configured for performing a balanced adjustment on load currents required by each of the plurality of BBUs according to remaining capacity percentages of the plurality of BBUs;
  wherein each of the plurality of BBU balanced power supply control systems comprises:

a control circuit, configured for obtaining a first remaining capacity percentage and a first output current of a BBU, generating reference level signals based on a ratio of the first output current to the first remaining capacity percentage, and adjusting the first output current of the BBU according to an obtained adjustment signal;

the gating circuit, wherein the gating circuit is a voltage following circuit based on an operational amplifier, an output end of the gating circuit is in series with a first diode, and the gating circuit is configured for connecting to an another BBU balanced power supply control system through a negative end of the first diode, and selecting a reference level signal having a maximum voltage value among the reference level signals as a first adjustment signal for the balanced adjustment to be inputted to a next circuit;

a first comparison circuit, wherein the first comparison circuit is a differential amplifier circuit based on an operational amplifier, and the first comparison circuit is configured for comparing a reference level signal of a local BBU with the first adjustment signal and outputting a second adjustment signal to a next circuit;

a second comparison circuit, wherein the second comparison circuit is an integral amplifier circuit based on an operational amplifier, an output end of the second comparison circuit is in series with a second diode, and the second comparison circuit is configured for comparing the second adjustment signal with an input voltage of a first forward end of the second comparison circuit and outputting a third adjustment signal, and is connected to a next circuit through a positive end of the second diode; and an output voltage stabilizing circuit, configured for collecting an output voltage of the local BBU, comparing the output voltage being proportionally reduced with the third adjustment signal, and outputting a fourth adjustment signal to the control circuit, wherein a reference voltage inputted to a second forward end of the first comparison circuit is the same as the input voltage inputted to the first forward end of the second comparison circuit.

17. The multi-BBU power supply system according to claim 16, wherein a number of the plurality of BBU balanced power supply control systems and a number of the plurality of BBUs are at least 2;

the multi-BBU power supply system is configured for performing multi-BBU parallel balanced power supply for one or more load devices.

18. The multi-BBU power supply system according to claim 16, wherein under a condition that ratios of the load currents of the plurality of BBUs to corresponding remaining capacity percentages are different, the plurality of BBU balanced power supply control systems respectively perform following actions:

a BBU balanced power supply control system corresponding to a BBU having a maximum ratio of the load current to the corresponding remaining capacity percentage controls to reduce the first output current of the BBU; and a BBU balanced power supply control system corresponding to another BBU controls to raise the first output current of the BBU.

19. The multi-BBU power supply system according to claim 16, wherein under a condition that ratios of the load currents of the plurality of BBUs to corresponding remaining capacity percentages are equal, the plurality of BBU balanced power supply control systems are all in a steady state, and output currents of the plurality of BBUs remain unchanged.

20. A server, wherein one or more BBU balanced power supply control systems are integrated in the server, and each of the one or more BBU balanced power supply control systems is configured as a backup power interface of the server;

wherein each of one or more BBU balanced power supply control systems comprises:

a control circuit, configured for obtaining a first remaining capacity percentage and a first output current of a BBU, generating reference level signals based on a ratio of the first output current to the first remaining capacity percentage, and adjusting the first output current of the BBU according to an obtained adjustment signal;

a gating circuit, wherein the gating circuit is a voltage following circuit based on an operational amplifier, an output end of the gating circuit is in series with a first diode, and the gating circuit is configured for connecting to an another BBU balanced power supply control system through a negative end of the first diode, and selecting a reference level signal having a maximum voltage value among the reference level signals as a first adjustment signal for balanced adjustment to be inputted to a next circuit;

a first comparison circuit, wherein the first comparison circuit is a differential amplifier circuit based on an operational amplifier, and the first comparison circuit is configured for comparing a reference level signal of a local BBU with the first adjustment signal and outputting a second adjustment signal to a next circuit;

a second comparison circuit, wherein the second comparison circuit is an integral amplifier circuit based on an operational amplifier, an output end of the second comparison circuit is in series with a second diode, and the second comparison circuit is configured for comparing the second adjustment signal with an input voltage of a first forward end of the second comparison circuit and outputting a third adjustment signal, and is connected to a next circuit through a positive end of the second diode; and an output voltage stabilizing circuit, configured for collecting an output voltage of the local BBU, comparing the output voltage being proportionally reduced with the third adjustment signal, and outputting a fourth adjustment signal to the control circuit, wherein a reference voltage inputted to a second forward end of the first comparison circuit is the same as the input voltage inputted to the first forward end of the second comparison circuit.

* * * * *